Oct. 3, 1944. H. E. ALTGELT 2,359,600
PLOW
Filed Jan. 4, 1941 6 Sheets-Sheet 2

INVENTOR.
Herman E. Altgelt,
BY John P. Smith
Atty.

Patented Oct. 3, 1944

2,359,600

UNITED STATES PATENT OFFICE 2,359,600

PLOW

Herman E. Altgelt, South Bend, Ind., assignor to Oliver Farm Equipment Company, a corporation of Delaware Application January 4, 1941, Serial No. 373,074

19 Claims. (Cl. 97—72)

The present invention relates generally to plows, but more particularly to a novel and improved power lift mechanism and a novel and improved form of an adjustable draft hitch for connecting the plow to the drawbar of a variety of tractors in such a manner that the controls of the plow are within easy accessible reach of the operator on the tractor.

Considerable difficulty has been experienced heretofore by plow operators in maintaining the plows in elevated or raised position when they are being transported over rough ground in that the locking mechanism usually provided sometimes jars loose and allows the plows to drop to the ground.

Other difficulties encountered in connection with providing hitches for plows is the fact that there is no standardization by the tractor manufacturers in the location of the operator's seat with respect to the implement attaching point on the drawbar. In order to overcome this situation, plow manufacturers have found it necessary to provide relatively long levers or depth regulating and leveling devices with adjustable or telescoping arrangements so that the control levers may be shortened or lengthened to be within easy reach of the operator's seat. This arrangement has proven to be unsatisfactory in that long levers cause excessive vibration when the tractors and plows are drawn over rough ground, causing in many instances, a crystallization of the steel and breaking of the levers.

It is therefore one of the primary objects of the present invention not only to correct the difficulty hereinbefore pointed out, but to also provide a novel and improved power lift mechanism which is simple in construction, efficient in operation and provided with a novel and positive locking mechanism for retaining the plows in elevated position when the same is being transported.

Another object of the invention is to provide a novel and improved plow construction in which the sector and its associated leveling lever is located at the forward end of the plow beam.

Another object of the invention is to provide a novel and improved plow construction in which a leveling mechanism is operatively connected with the lifting mechanism through an evener.

A still further object of the invention is to provide a novel and improved tractor hitch construction for plows which is narrow in width so as to eliminate the gathering of stalks and trash thereon and which is also provided with sufficient flexibility, but limited in its up and down movement so that if it becomes necessary to back the tractor when an obstruction is encountered by the plow, the backing may be accomplished without buckling or jack-knifing the hitch.

A still further object of the invention is to provide a novel and improved plow construction in which an evener is pivotally mounted on one of the crank wheel axles and has associated therewith an adjustable link connection which permits the employment and use of furrow wheels of different diameters. Such an arrangement also permits the operator to make use of second-hand tires discarded from well-known less expensive automobiles by merely substituting automobile wheels for the steel ones usually provided.

These and other objects are accomplished by providing a construction and an arrangement of the various parts in the manner hereinafter described and particularly pointed out in the appended claims.

Referring to the drawings.

In illustrating the preferred form of my improved plow construction and power lift mechanism, I have shown the same as comprising a longitudinally extending forward plow beam or frame member 15. Spaced laterally from and extending parallel to the beam member 15 is a second plow beam or frame member 16. The rear end of each of the beam members 15 and 16 are curved downwardly and have attached thereto in a manner well understood in the art, plow bases 17 and 18 respectively. The frame member 15 has secured to its rear end a contiguously curved reinforcing member 19. Extending diagonally between the beam members 15 and 16 is a bracing frame member 20 which has its rear end as shown at 21 curved downwardly in conformity with the curved rear portion of the beam 16 for reinforcing and strengthening that beam. The forward ends of the beams 15 and 16 are connected by transverse frame member 22. Extending transversely with respect to and securing the intermediate portions of the beams 15 and 16 together, is a second transverse frame member 23. Located in suitable bearing members 24 and secured to the beams 15 and 16 is a crank axle 25. Journaled on the free end of the crank axle 25 is a conventional furrow wheel 26. Journaled in suitable bearing brackets 27 and 28 carried by each of the respective beams 15 and 16 and rearwardly of the first crank axle 25 is a second crank axle 29. Journaled on the outer free end of the crank axle 29 is a conventional land wheel 30. The rear end of the plow is supported on an adjustable furrow wheel 31 which in turn is journaled on the free end of a crank axle 32. Secured to the forward end of the crank axle 32 is a bracket 33. This bracket 33 and crank axle 32 are pivoted on a bolt 34 carried by a bracket 35. This bracket 35 is rigidly secured to the rear curved portion of the beam 16 and reinforcing bracing member 21. This rear furrow wheel is actuated in raising and lowering the plow by the power lift mechanism hereinafter described through the medium of a lever 36 which has its intermediate portion thereof pivoted at 37 to the bracket 35.

One of the important features of the present invention includes an arrangement whereby relatively short levers for adjusting and controlling the plow may be employed so that they will be within easy reach of the operator on the tractor seat. The leveling mechanism in the present instance includes a lever 38 pivoted at 39 to the forward end of the beam 15. The lever 38 is provided with the conventional detent mechanism generally indicated by the reference character 40, which is adapted to engage a sector 41 for locking the lever in various positions of adjustment. This sector 41 is secured to the forward end of the beam 15. Secured to and extending from one side of the lower end of the lever 38 is a plate 42. Pivotally connected to the outer end of the plate as shown at 43 is a rearwardly extending link 44. The rearward end of the link 44 is pivotally connected as shown at 45 to the lower end of an evener 46. An intermediate portion of the evener 46 as shown at 47 is pivotally connected to the upper end of a crank arm 48. The lower end of the crank arm 48 is rigidly welded to the horizontal portion of the crank axle 25 at a point adjacent the outside of the beam 15. The upper end of the evener 46 is pivotally connected as shown at 49 to a rearwardly extending link or rod 50. The rear end of the rod 50 is threaded and has mounted in threaded engagement therewith an adjustable knuckle 51. The knuckle 51 is provided with a laterally extending stud 52 which is journaled in an aperture in the upper end of a crank arm 53. The crank arm 53 is formed integrally with and located on the furrow side of the land wheel axle 29. It will be obvious from the above description that upon the adjustment of the lever 38 that relative adjustment of the furrow wheel 26 with respect to the land wheel 30 and frame of the plow may be accomplished. This adjustment effects the leveling of the plow and may be accomplished from the operator's seat on the tractor with a relatively short lever. It will also be observed that by providing an adjustable link, such as the threaded link 50 with its associated threaded knuckle 51, different sizes of furrow wheels (and land wheels too) may be employed so that if the operator is desirous of making use of discarded automobile tires of the less expensive variety, substitution of suitable rims regardless of their diameter may be employed inasmuch as the adjustment herein provided permits their use.

The mechanism which permits the adjustment of the plow for the depth penetration of the plow bases includes a hand operated crank 54 which extends forwardly to a position within easy reach of the operator's seat on the tractor. The crank in this instance is journaled in a bearing or sleeve 55 which in turn is swiveled between the spaced apart upper ends of the supporting members 56. The supporting members 56 have their downwardly extending inclined portion 57 secured to the beam member 16. The member 57 is braced by a diagonal brace 58. The rear end of the crank 54 is connected with a screw adjustment 59 of any suitable conventional construction. Connected to one end of the screw mechanism 59 is a pair of spaced apart parallel straps or bars 60. These bars 60 embrace and slidably engage the upper end of an upwardly extending lever arm 61 which has its lower end welded to the land wheel axle 29 at a point adjacent the beam 16. The rear end of the parallel straps 60 are held in spaced relation with respect to one another by spacer tube 62 which in turn is held in position by a transverse pin 63. In certain positions of the plow the spacer tube 62 is adapted to engage a semicircular notch 64 formed in the rear edge of the upper end of the arm 61. (See Fig. 5 of the drawings.) The bars 60 are held in guided relation with respect to the upper end of the lever 61 as the latter is oscillated to and fro in its operation by means of upper and lower pins or cotters 65. An intermediate portion of the crank or lever 61 is pivotally connected as shown at 66 to a rearwardly extending link 67. The rear end of the link 67 is pivotally connected as shown at 68 to a pair of rearwardly extending short parallel links 69. The rear end of the short links 69 are pivotally connected as shown at 70 to the upper arm of the lever 36.

From the above description it will be obvious that upon the manipulation of the manually operable crank arm 54 in a direction to cause the screw mechanism 59 to shorten its length, the crank 61 will be moved forwardly, thereby depressing the land wheel axle 29 and its associated land wheel 30 so as to raise the frame with respect to the land wheel. Simultaneously with this movement, the crank 53 is moved forwardly, thereby actuating the link 50 forwardly, which in turn, actuates the evener 46 in a clockwise and forward direction as viewed in Fig. 1 of the drawings. The actuation of the evener 46 in this direction in turn actuates the crank 48 forwardly and the furrow wheel axle 25 downwardly, thereby depressing the furrow wheel 26. Simultaneously with the movement of the lever 61 forwardly, the links 67 and 69 will be actuated forwardly so that when the slack is taken up in these links, they in turn will actuate the lever 36 forwardly so as to depress the rear furrow wheel 31. Obviously by manipulating the manual crank 54, the relative depth penetration of the plow bases 17 and 18 may be controlled and through the manipulation of the hand lever 38 by a series of connections including the equalizer lever 46, the latter of which forms part of the depth adjustment, the leveling of the plow may be accomplished so as to secure uniform plowing under all land conditions.

Figure 7:
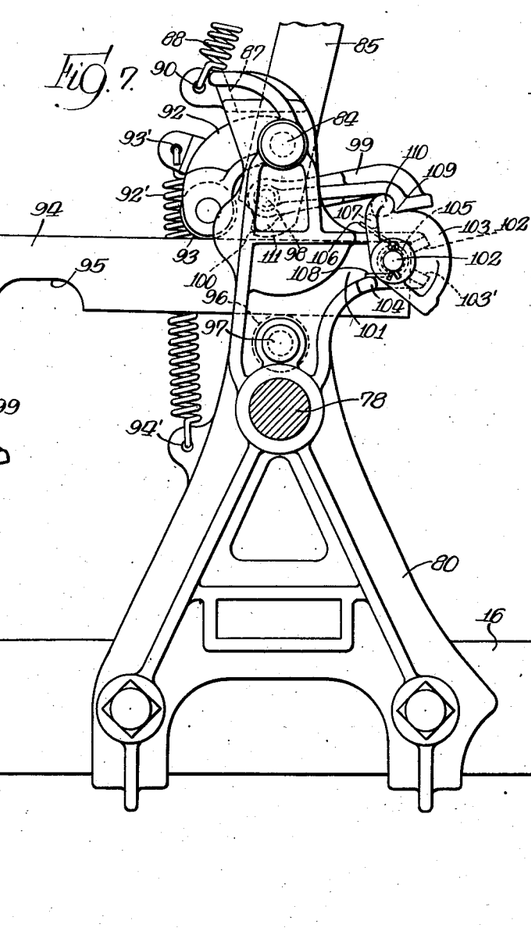
Fig. 7 is an enlarged detailed side elevational view of the power lift tripping and locking mechanism.
Figure 8:
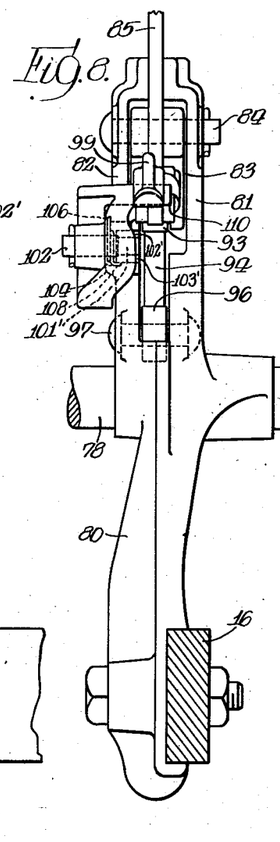
Fig. 8 is a front elevational view of the mechanism shown in Fig. 7.
Figure 9:
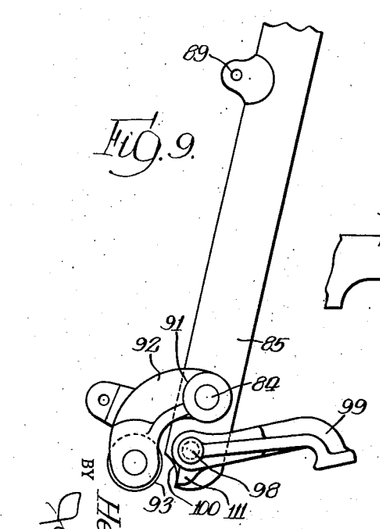
Fig. 9 is an enlarged detailed side elevational view of the trip lever and associated parts.

Another very essential feature of the invention includes a novel power lift mechanism and positive means for locking a plow structure in elevated or transporting position. This mechanism includes a pinion in the form of two spaced apart discs 71 and 72 which are preferably formed integrally with the hub or bearing 73 of the land wheel 30. (See Figs. 2 to 5 inclusive of the drawings.) Extending through aligned apertures, spaced concentrically about the discs 71 and 72 are transverse pins 74. Journaled on each of these pins between the discs 71 and 72 are rollers 75. Adapted to swing into the path of and be engaged by the rollers 75 of the pinion is a rack 76. The rack 76 has a plurality of teeth 77 which are arranged in spaced apart relation in substantially the arc of a circle so as to be successively engaged by the rollers 75 in the operation of elevating the plow bases and frame structure from ground engaging position to elevated or raised position in the manner hereinafter more fully described. The forward end of the rack 76 is rigidly secured to a transverse shaft 78. One end of the shaft 78 is journaled in a bearing bracket 79 which in turn is secured to the longitudinal beam 15. An intermediate portion of the shaft 78 is journaled in a second bearing bracket 80, which in turn, is rigidly secured to the other beam member 16. (See Figs. 3 to 8 inclusive.) Formed integrally with the bearing bracket 80 and extending above the shaft 78 are laterally spaced apart upwardly extending side wall supporting sections 81 and 82. These side wall sections form in effect a longitudinally extending opening 83. Pivoted between the sections 81 and 82 on a pin 84 is a trip lever 85. (See Fig. 9.) The upper end of the trip lever 85 is connected by means of a longitudinally extending rod 86. The trip rod 86 extends through a guide on the upper ends of the supports 56 and projects forwardly to within easy reach of the operator's seat on the tractor. The trip lever 85 is normally actuated rearwardly against a stop 87 formed on the bracket 80 by means of a spring 88 which has its upper end connected to an eye 89 welded to the rear edge of the lever 85 and its lower end connected as shown at 90 to an ear formed on the bracket 80. Also pivoted on the pin 84 by having its bifurcated portion 91 contacting each side of the lower end of the lever 85 is a pivoted roller arm 92. Journaled in the free or lower end of the roller arm 92 is a roller 93. The roller 93 of the roller arm 92 is adapted to ride on the upper edge of a reciprocable locking bar 94. The locking bar 94, trip lever 85 and roller arm 92 are all located within the longitudinal extending opening 83 formed between the side walls 81 and 82 of the bracket 80. The rear end of the locking bar 94 is pivotally connected as shown at 66 to the crank arm 61 of the land wheel axle 29. Located adjacent the forward end of the locking bar 94 and on the lower edge thereof is a cut out or locking notch 95 which is adapted to engage and lock upon a roller 96 journaled on a pin 97 carried by the bracket 80. It will be noted that the locking bar is adapted to reciprocate and have its lower edge ride upon the roller 96 and when the power lift mechanism is tripped and actuated to elevate the plow bases to their inoperative position, the bar 94 is actuated forwardly until the notch 95 engages the roller 96 and the spring actuated roller arm 92 depresses the notch 95 of the bar 94 into engagement with the roller 96 to such a point that the roller arm 92 practically locks on dead center for securely locking and retaining the plow bases in elevated position. The roller arm 92 and roller 93 are normally actuated against the top edge of the locking bar 94 by means of a spring 92' which has its upper end connected as shown at 93' to an ear formed on the rear side of the roller arm 92 and the lower end of the spring connected as shown at 94' to an ear formed on the bracket 80. (See Fig. 7.) Pivoted to the lower end of the trip lever 85 below its pivot 84 as shown at 98 is a hook or latch 99. The lower end of the trip lever 85 has a cut out portion 100 which conforms to the curvature of the roller 93 and is adapted to move into the path of the roller when the trip lever is actuated forwardly to disengage the roller arm 92 and roller 93 from its locking position against the locking bar 94 in the manner hereinafter described. Pivoted to the forwardly extending portion 101 of the bracket 80 and above the shaft 78, on a pin 102 is an intermediate trip and locking member 103. The intermediate locking member 103 is provided with a laterally projecting lug 101' which is adapted to engage upper and lower stops 102' and 103' respectively formed on the extension 101 of the bracket 80 for limiting the oscillatory movement of the member 103. The intermediate locking member 103 is normally actuated against the lower stop 103' by a spring 105 which has its coils embracing the pin 102. One of the legs of the spring 105 as shown at 106 engages a projecting lug 107 on the intermediate locking member 103. Another leg 108 of the spring 105 engages a lug 104 on the bracket 80. The spring above described holds the intermediate latch 103 in its normal position against the stop 103' or the position indicated in Fig. 5 of the drawings. A round pointed hook portion 109 of the latch 99 is adapted to engage a laterally projecting pin-like portion 110 on the intermediate latch member 103. The latch member 99 is disengaged from and held out of engagement with the intermediate locking member 103 by the roller 93 of the roller arm 92, when the roller 93 contacts a downwardly projecting lug 111 formed on the latch member 99 at a point adjacent its pivot 98.

Figures 5, 6:
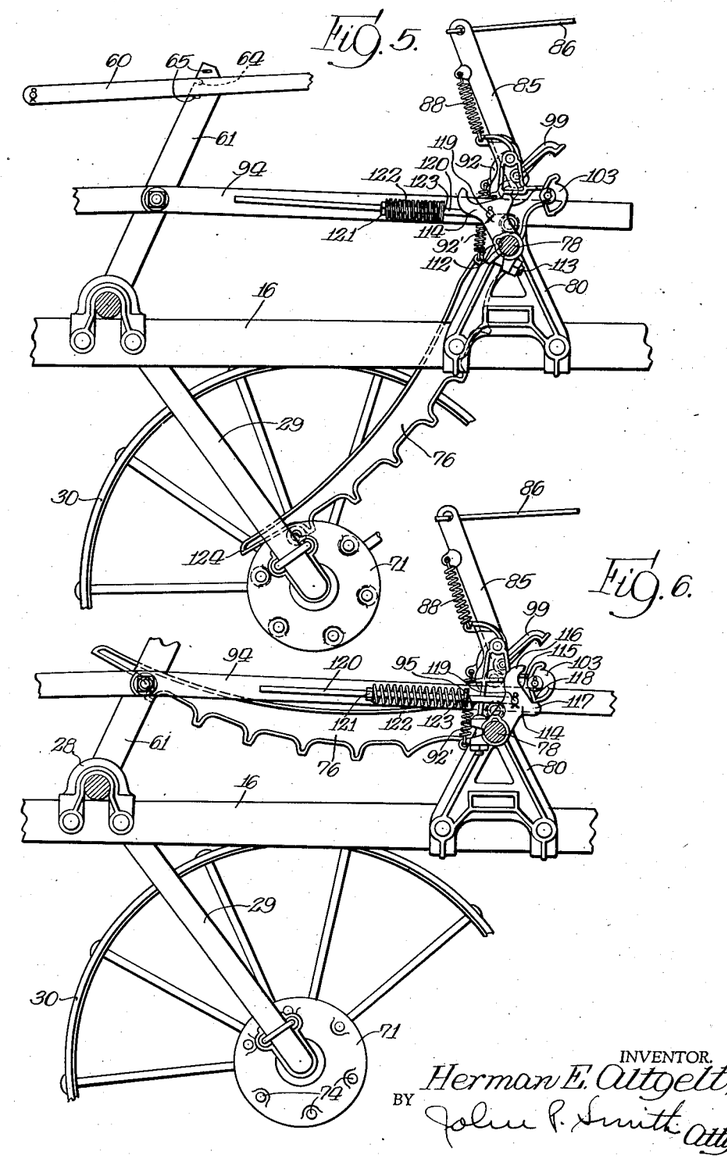
Fig. 5 is a view similar to Fig. 3 showing the position of the parts at the conclusion of the power lift cycle and just prior to the time the lifting rack is elevated.
Fig. 6 is a similar view showing the position of the parts at the conclusion of the lifting operating with the rack elevated to its normally raised position.

From the above it will be noted that when the roller arm 92 and rollers 93 are in vertical position or in the position vertically below the pivot 84 of the lever 85 which position it assumes when the locking notch 95 of the locking bar 94 engages the roller 96, the latch member 99 is in its raised position disengaged from the intermediate locking member 103 as shown in Figs. 5 and 6 of the drawings. Securely fastened to the shaft 78 by means of a key 112 and a bolt 113 is a rack locking member 114. The member 114 is provided on its free end with a cut-out portion 115 which terminates at its outermost end in a hook 116 and at the other end in a lug 117. (See Fig. 6.) This latch member 114 is located in the path of the intermediate latch member 103 and the lug thereof 117 is adapted to engage a downwardly extending portion 118 formed on the latch member 103.

Figure 3:
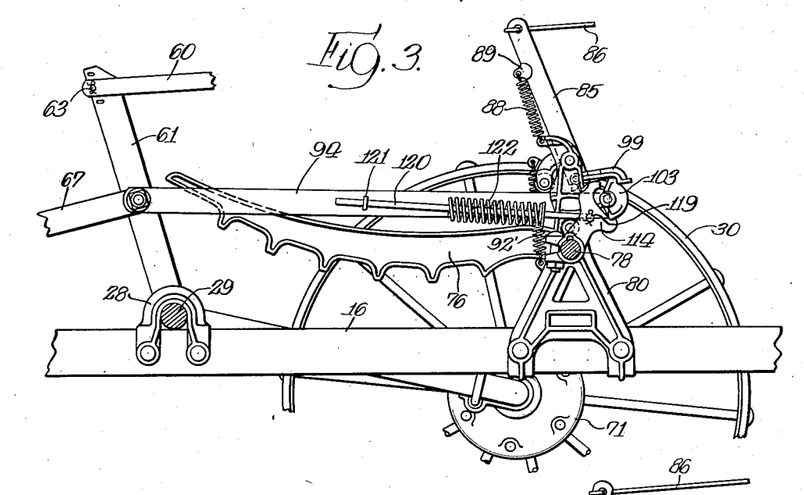
Fig. 3 is an enlarged fragmentary side elevational view showing the position of the power lift rack when the plow is in lowered position.
Figure 4:
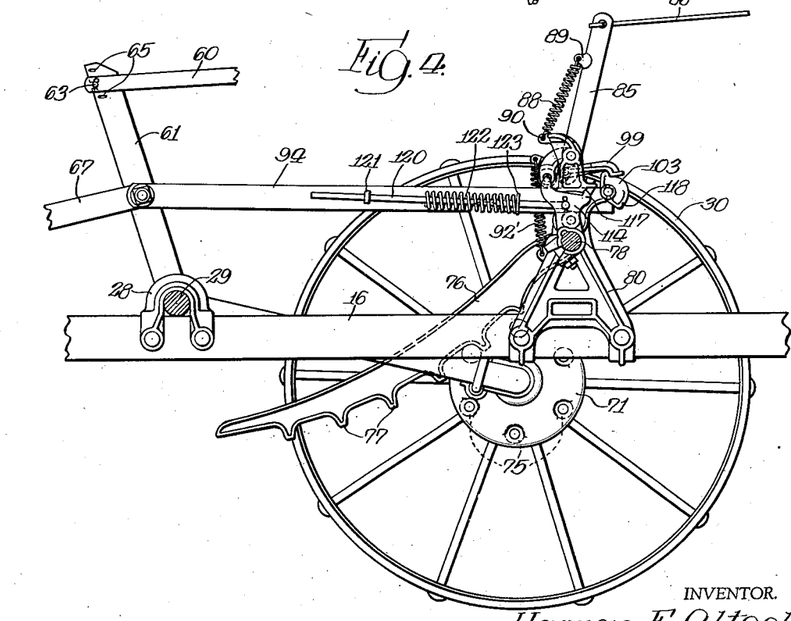
Fig. 4 is a similar view showing the power lift lever tripped with the rack lowered into engagement with its pinion preparatory to elevating the plows out of the ground.

From the above description it will be obvious that the lug portion 118 of the intermediate latch member 103 is adapted to engage the locking member 114 for holding the rack 76 and shaft 78 in its raised position or the position shown in Figs. 3 and 6 of the drawings. Pivotally connected to the locking member 114 as shown at 119 is a rearwardly extending rod 120. The rear portion of the rod 120 is reciprocally mounted in an eye 121 welded to one side of the locking bar 94. Mounted on the rod 120 is a compression spring 122. Welded to the rod 120 at a point adjacent its forward end is a washer or collar 123. The eye 121 on the bar 94 and the washer 123 on the rod 120 are adapted to compress the spring 122 during the cycle of operation of the lifting mechanism parts so as to place the latch 114 under spring pressure as shown in Fig. 5 so as to actuate the shaft 78 to lift or elevate the rack 76 at the completion of the lifting operation in the manner hereinafter more fully described.

The operation of my improved power lift mechanism and positive locking means for retaining the plow bases in elevated position will next be described. Let us assume that the plow bases are in their lowered or plowing position, or in the position shown in Figs. 1 and 3 of the drawings. Also let us assume that the operator on the tractor is desirous of lifting or elevating the plows out of the ground. This is accomplished by pulling the rod 86 forwardly from the operator's seat so as to actuate the trip lever 85 forwardly from the position shown in Figs. 1 and 3 of the drawings to the position shown in Fig. 4 of the drawings. As the trip lever 85 is actuated forwardly, the latch 99 carried on the lower end of the lever 85 is moved rearwardly, thereby actuating the intermediate latch 103 in a counter-clockwise direction as viewed in Fig. 4 of the drawings. When the intermediate locking member 103 is actuated to a position so that the locking portion 118 of this member moves away from the lug 117 of the locking member 114, the weight of the rack 76 is free to fall from the position shown in Fig. 3 to that shown in Fig. 4 of the drawings where the teeth 77 engage the rollers 75 of the pinion 71 carried by the land wheel axle 30. It will be observed that as the plow beams 15 and 16 together with the plow bases approach their most elevated position, the land wheel axle 29 is depressed with respect to the frame of the plow, the lever arm 61 carried by said axle is actuated forwardly, and at the same time the rack 76 is slightly actuated in a counter-clockwise direction (as viewed in Fig. 4 of the drawings) with the shaft 78. The locking bar 94 is also moved forwardly so as to compress the spring 122 between the eye 121 and the collar or washer 123 so that when the rear end or tail 124 of the rack bar 76 contacts one of the rollers 75 of the pinion 81, the rack 76 is disengaged from the pinion and the compressed spring 122 automatically raises the rack from the position shown in Fig. 5 to the position shown in Fig. 6. At the conclusion of the lifting operation, the locking bar is moved forwardly so that the locking notch 95 of the bar 94 engages the locking roller 96. (See Figs. 6 and 7 of the drawings.) It will also be observed that while the bar 94 is moving forwardly during the power lift cycle the roller arm 92 together with the roller 93 is engaging the upper edge of the bar 94 and by the action of the spring 92′, depresses the bar downwardly so that the notch 95 will engage the roller 96 when it becomes in alignment therewith. In this connection it will also be noted that the roller arm 92 and roller 93, particularly the axial center of the latter thereof, assumes a position of about 90° or dead center below its pivot on the pin 84 so as to provide a positive lock and prevent disengagement of the bar or accidental unlocking or lowering of the plow bases while the plow is being transported over rough soil. Simultaneously with the upward swinging movement of the rack 76 from the position shown in Fig. 5 to that shown in Fig. 6 by the action of the compressed spring 122, the locking member 114 is swung in a clockwise direction to a point where the lug 117 of the locking member 114 engages the downwardly projecting locking portion 118 of the intermediate locking member 103 so as to positively lock and retain the rack in its elevated position or the position shown in Fig. 6 of the drawings. It will also be observed that while the roller arm 92 and roller 93 assume their vertical position as shown in Figs. 5 and 6 of the drawings, the roller 93 engages the lug 111 of the latch 99 so as to hold the same out of engagement with the intermediate latching member 103 as shown in Figs. 5 and 6 of the drawings. It will also be noted that as the land wheel axle 29 is actuated by the power lift mechanism hereinbefore described, to raise the plow bases, the crank 53 of this land wheel axle is also actuated forwardly to actuate the adjustable link connection 50 forwardly. This forward movement of the link 50 actuates the evener 46 in a clockwise direction as viewed in Fig. 1 or about the pivot 45 of the link 44.

The clockwise and forward movement imparted to the evener member 46 is, in turn, imparted to the crank 48 of the furrow wheel axle 25 to simultaneously depress the furrow wheel 26 with the land wheel 30 in the operation of elevating the plow bases from the ground. As the land and furrow wheels of the plow are being depressed by the action of the power lift mechanism, the links 67 and 69 are actuated forwardly to operate the lever 36, which in turn depresses the rear furrow wheel 31 to raise the rear end of the plow frame with the front end.

Figure 1:
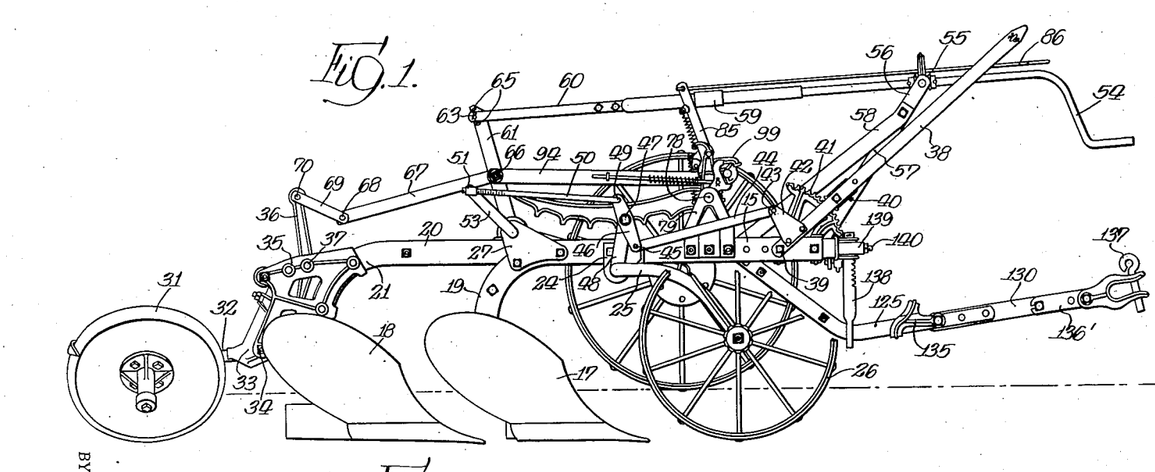
Fig. 1 is a side elevational view of my improved plow showing the plow bases in their lowered or ground engaging position.

If the operator is desirous of lowering the plow bases from their elevated position or the position shown in Fig. 6 to ground engaging position, or the position shown in Figs. 1 and 3 of the drawings, the trip lever 85 is again moved forwardly from the position shown in Fig. 6 of the drawings. The forward movement of the lever 85 from this position causes the lower curved cutout portion 100 on the lower end of the lever 85 to engage the roller 93 on the roller arm 92 and thereby actuate it rearwardly so that the notch 95 of the locking bar may become unlatched from the locking roller 96. When this is accomplished, the plow bases and frame drop to the ground and all of the operative parts and tripping mechanisms of the power lift mechanism assume the position shown in Figs. 1 and 3 of the drawings.

Another very essential feature of the present invention involves a novel type of hitch which is not only narrow in construction so as to eliminate the accumulation of trash, but also can be lengthened or shortened to afford the most convenient location to the operator's seat on the tractor so that easy access to the depth and leveling controls of the plow may be obtained without excessively long vibrating types of levers heretofore used. This novel type of hitch shown in Figs. 1 and 2, 12 and 13 of the drawings and used in connection with the three wheel type of plow illustrated in Figs. 1 and 2 of the drawings, comprises a rear draft member 125 which is in the form of two steel bars 126 bolted together. The rear ends of these members are bent upwardly as shown at 127. Secured to the rear end of the steel bars 126 and preferably between them is a twisted draft bracket 128 which in turn is pivotally secured to the transverse frame member 23 of the plow frame. Pivotally connected to a bolt 129 between the forward portions of each of the spaced apart draft members 126 is a supplemental draft member 130. In order to permit adjustment of the length of the draft hitch so as to accommodate the accessibility of the lever controls from the operator's seat on the tractor when the plow is used in connection with various types of tractors, a series of aligned apertures are provided in the forward ends of the draft members 126 so that the bolt 129 may be inserted therein to change the length of the draft hitch. The rear end of the supplemental draft member 130 converges to a pointed end or is reduced in width as shown at 132 and the upper and lower edges of this tapered portion are adapted to engage the upper and lower stops 133 and 134 respectively of a casting 135 which is mounted on and held in position with respect to the draft members 126 by the bolt 129. The bracket 135 is provided with shoulders 136 which rest on the upper edges of the draft members 126 so as to prevent its displacement therefrom. Secured to the forward end of the supplemental draft member 130 is a U-shaped draft strap 136'. Secured to the forward end of the draft strap 136' is the usual draft clevis and pin 137 for connecting the draft hitch to the tractor drawbar. An intermediate portion of the draft member 125 extends through a slotted opening in a vertically extending guide 138. The drawbar guide 138 may be moved up or down or adjusted transversely with respect to the transverse frame member 22 and secured in adjusted position by a clamping member 139 and a bolt 140. This adjustment permits the plow to be placed in correct position not only laterally with respect to the tractor, but also permits regulation or adjustment of the draft hitch in proper relation with respect to the drawbar of the tractor.

From the above description it will be seen that by limiting the pivotal movement of the forward draft member 130 about its pivot 129, the rear end 132 floats between the stop during plowing operation, thereby always retaining the same freedom of vertical movement within the limits of the stops 133 and 134 on the casting 135. The principal advantage accomplished by providing limited movement between these draft members is that when an obstruction is encountered by the plow it frequently becomes necessary to back the tractor and under such circumstances, the stop limits the pivotal action between these two parts and prevents the jack-knifing or buckling up of the hitch which occurs when no stops are provided.

Figures 2, 11:
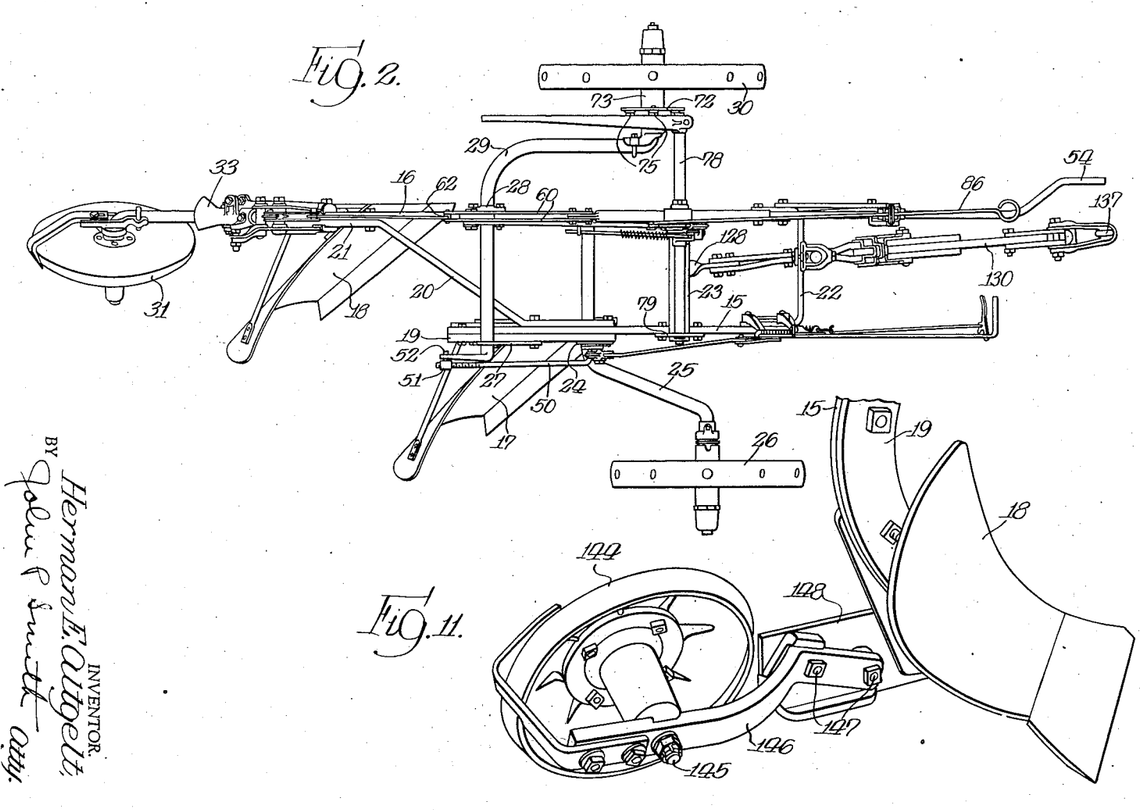
Fig. 2 is a top plan view of the same.
Fig. 11 is a perspective view of a revolving landside wheel which may be attached to the rearmost beam and plow of the construction shown in Fig. 10.
Figures 10, 14, 15:
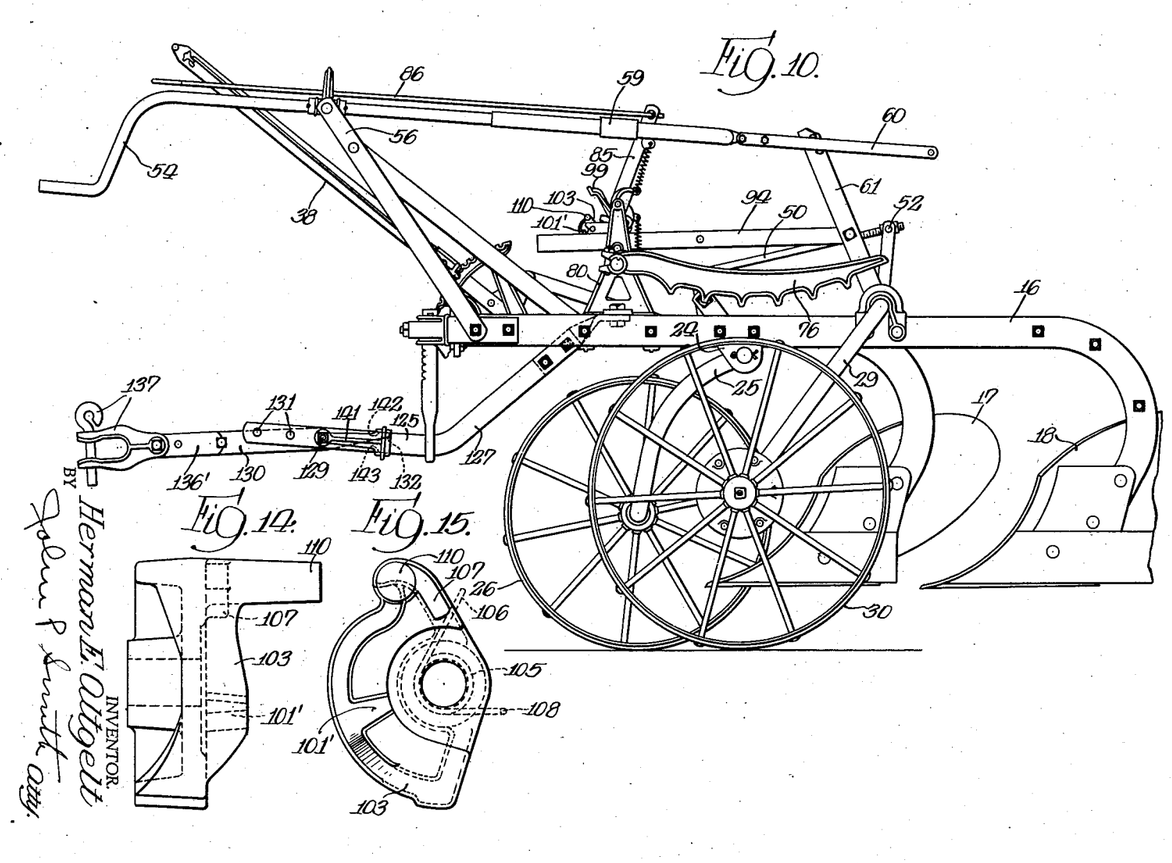
Fig. 10 is a side elevational view of a modified form of my improved plow, illustrating the construction when the same is supported on two wheels rather than three.
Fig. 14 is a detailed end elevational view of the intermediate locking member.
Fig. 15 is a side elevational view of the same.
Figures 12, 13:
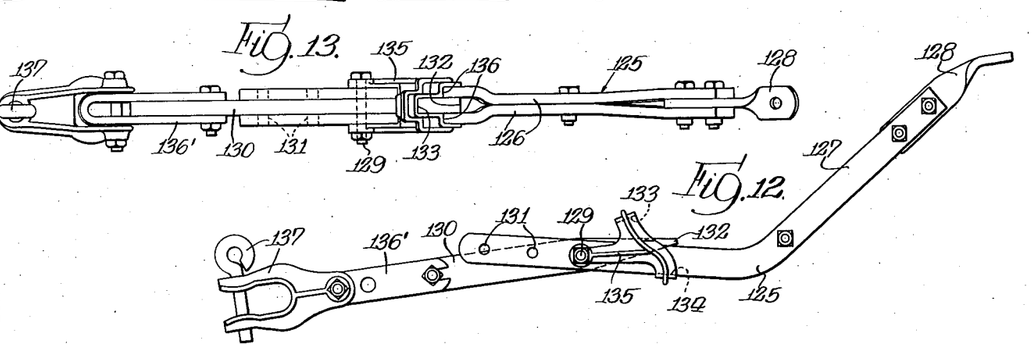
Fig. 12 is an enlarged side elevational view of my improved type of tractor hitch which is adapted to be used in connection with the three wheel type of plow shown in Figs. 1 and 2 of the drawings.
Fig. 13 is a top plan view of the same.

In the modified form of my invention shown in Fig. 10 of the drawings, the plow structure, the power lift mechanism and locking means, the leveling and depth penetration control are identical in every respect with the plow construction disclosed in Figs. 1 and 2 of the drawings with the only exception that the power lift actuated rear furrow wheel for supporting the rear portion of the plow has been eliminated so that the plow in this instance is supported on one end on the drawbar of the tractor and the two power actuated wheels of the plow. The same reference numerals designating similar parts in the modified structure have been placed upon the parts corresponding to those shown in Figs. 1 and 2 of the drawings. One other single distinguishing characteristic which is essential to be used on connection with the two wheel type of plow shown in Fig. 10 of the drawings is the fact that the stops for limiting the pivotal movement of the two draft members must, of necessity, be closer together than those used in connection with a three wheel type of plow shown in Figs. 1 and 2 of the drawings. With the type of plow shown in Fig. 10, the weight is borne by the two supporting wheels and balanced by the draw-bar of the tractor. The hitch used in connection with this type of plow comprising the draft members 125 and 130 are pivotally connected together by the bolt 129. (See Fig. 10.) This bolt also secures a draft bracket 141 of slightly different structure than the bracket 135 shown in Figs. 1, 2 and 12 of the drawings. This stop bracket 141 shown in Fig. 10 of the drawings, has stops 142 and 143 which engage the rear end 132 of the draft member 130 so as to limit the free movement of the forward end of the draft hitch. From the above construction it will be noted that when the plow is raised to transporting position, or the position shown in Fig. 10 of the drawings, the pointed end 132 of the draft member 130 will contact the upper stop 142 of the stop member 141 for the reason that greater weight of the plow is located rearwardly of the two supporting wheels in this modified structure. The stop in this construction of hitch also permits the tractor to be backed when the plow encounters an obstruction without buckling up the hitch as occasionally happens to hitches heretofore constructed.

The construction shown in Fig. 10 of the drawings may be further modified by the addition of a revolving landside which includes a furrow wheel 144 (see Fig. 11) which is journaled on a spindle 145 secured to a rearwardly extending bracket or arm 146. The forward end of this arm may be secured by means of bolts 147 to the landside 148 of the rear plow base 18. In this instance, the revolving landside or rear furrow wheel 144 as shown in Fig. 11 may be attached to the type of plow shown in Fig. 10 that when the plow is raised in its elevated position, the furrow wheel is carried suspended off the ground.

Summarizing the advantages and methods of operation of my improved plow construction, it will be readily seen that I have not only provided a simple power lift construction located out of the path of the trash and stalks, but one in which depth adjusting and level control levers together with the latter's associated sector are located in the forward portion of the plow frame so that relatively short levers may be employed for accomplishing these functions. These advantages are further augmented so as to make the plow available for connecting the same to a variety of different types of tractors by the provisions of a novel and adjustable tractor hitch of narrow construction, yet of sufficient flexibility to permit the efficient operation of the plow under varying soil conditions. It is further pointed out that my novel power lift construction, together with its associated locks and controls is simple in construction and positive in action so as to insure the retention of the plows in elevated position when the plow structure is being transported over rough or uneven ground.

While in the above specification I have described one embodiment and one modification which my invention may assume in practice, it will of course be understood that certain other modifications may be made without departing from the spirit and scope of the invention as expressed in the following claims.

What I claim is my invention and desire to secure by Letters Patent:

1. A plow comprising a frame, plow bases carried by said frame, a land wheel axle pivoted on said frame, a land wheel journaled on said axle, a furrow wheel axle pivoted on said frame, a furrow wheel journaled on said axle, upwardly extending cranks carried by said axles, an evener having an intermediate portion pivoted on the crank of said furrow wheel axle, an adjustable link connecting the upper end of the crank of the land wheel axle with the upper end of said evener, a manually operable lever pivoted on said frame, a connection between said lever and the lower end of said evener for effecting the levelling of said plow, a second crank secured to said land wheel axle, a depth adjustment mechanism mounted on said frame and engageable with said last named crank for controlling the depth penetration of said plow bases.

2. A plow comprising a frame, plow bases carried by said frame, wheels journaled on said axles, cranks secured to said axles, operative connections between said cranks, a manually operable lever pivoted at the forward end of said frame and operatively connected to said last named connections for vertically adjusting one of said wheels with respect to the other, an adjustable rear furrow wheel pivoted to the rear end of said frame, a second crank rigidly secured to said land wheel axle, operative connections between said last named crank and said rear furrow wheel, a lock bar pivoted to said last named crank and having a locking notch therein, means carried by said frame and engageable with said notch for locking said plow in raised position, and a power lift mechanism carried by said frame and operatively driven by one of said wheels for raising said plow.

3. A plow comprising a frame, plow bases carried by said frame, a land and a furrow wheel axle pivoted to said frame, wheels journaled on said axles, cranks secured to said axles, operative connections between said cranks, a manually operable lever pivoted at the forward end of said frame and operatively connected to said last named connections for vertically adjusting one of said wheels with respect to the other, an adjustable rear furrow wheel pivoted to the rear end of said frame, a second crank rigidly secured to said land wheel axle, operative connections between said last named crank and said rear furrow wheel, a lock bar pivoted to said last named crank and having a locking notch therein, means carried by said frame and engageable with said notch for locking said plow in raised position, a power lift mechanism carried by said frame and operatively driven by one of said wheels for raising said plow, and depth adjusting means mounted on said frame and slidably engaging said last named crank for adjusting the depth penetration of said plow bases.

4. A plow comprising a frame, plow bases carried by said frame, land and furrow wheel axles pivoted on said frame, wheels journaled on said axles, operative connections between said axles, a pinion secured to one of said wheels, a rack pivoted on said frame and movable into engagement with said pinion for raising said plow, means for raising said rack out of engagement with said pinion, means for locking said plow in raised position, means for locking said rack in raised position, manually operable means mounted on said frame, and means actuated by said last named means for successively unlocking both of said locking means.

5. A plow comprising a frame, plow bases carried by said frame, land and furrow wheel axles pivoted on said frame, wheels journaled on said axles, operative connections between said axles, a pinion secured to one of said wheels, a rack pivoted on said frame and movable into engagement with said pinion for raising said plow, means for raising said rack out of engagement with said pinion, means for locking said plow in raised position, means for locking said rack in raised position, a lever pivoted on said frame, and operative connections between said lever and said last two named means for successively controlling their operation.

6. A plow comprising a frame, plow bases carried by said frame, land and furrow wheel axles pivoted on said frame, wheels journaled on said axles, operative connections between said axles, a pinion secured to one of said wheels, a rack pivoted on said frame and movable into engagement with said pinion for raising said plow, means for raising said rack out of engagement with said pinion, means for locking said plow in raised position, means for locking said rack in raised position, a trip lever pivoted on said frame, and means actuated by said lever for successively unlocking said last two named means.

7. A plow comprising a frame, plow bases carried by said frame, land and furrow wheel axles pivoted on said frame, cranks carried by each of said axles, operative connections between said cranks for effecting the leveling of said plow, power lift mechanism carried by said frame and driven by one of said wheels, operative connections between one of said axles and said leveling connections for lifting said plow by said power lift mechanism, and means operatively connected to one of said axles for locking said plow bases in elevated position.

8. A plow comprising a frame, plow bases carried by said frame, land and furrow wheel axles pivoted on said frame, cranks carried by each of said axles, operative connections between said cranks, and a manually operable lever pivoted directly to at the forward end of said frame and operatively connected to one of said cranks for levelling said plow.

9. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a reciprocable locking bar operatively connected to said land wheel axle and having a locking notch therein, a roller journaled on said frame and engageable with the notch in said bar, a trip lever pivoted to said frame, a spring pressed roller pivoted to said lever for normally depressing and locking said bar against said first named roller, means for locking said rack in elevated position, and means carried by said trip lever and engageable with said locking means for unlocking said rack.

10. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a reciprocable locking bar operatively connected to said land wheel axle and having a locking notch therein, a roller journaled on said frame and engageable with the notch in said bar, a trip lever pivoted to said frame, a spring pressed roller arm pivoted to said lever for normally depressing and locking said bar against said first named roller, a locking latch associated with said rack, an intermediate locking member pivoted on said frame and engageable with said latch for holding said rack in elevated position, and a hook member pivoted to said trip lever and engageable with said locking member for releasing said rack into engagement with said pinion.

11. A plow comprising a frame, plow bases carried by said frame, axles pivoted to said frame, wheels journaled on said axles, cranks secured to said axles, operative connections between said cranks, a manually operable lever pivoted at the forward end of said frame and operatively connected to said last named connections for vertically adjusting one of said wheels with respect to the other, an adjustable rear furrow wheel pivoted to the rear end of said frame, a second crank rigidly secured to said land wheel axle, operative connections between said last named crank and said rear furrow wheel, a lock bar pivoted to said last named crank and having a locking notch therein, means carried by said crank and engageable with said notch for locking said plow in raised position, a trip lever pivoted to said frame, a pinion carried by one of said wheels, a rack pivoted to said frame and movable into engagement with said pinion, a locking latch associated with said rack, a locking member pivoted on said frame and engageable with said latch for holding said rack in elevated position, and a hook member pivoted to said trip lever and engageable with said locking member for releasing said rack into engagement with said pinion.

12. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a reciprocable locking bar operatively connected to said land wheel axle and having a locking notch therein, a roller journaled on said frame and engageable with the notch in said bar, a trip lever pivoted to said lever for normally depressing and locking said bar against said first named roller, means for locking said rack in elevated position, means carried by said trip lever and engageable with said locking means for unlocking said rack, and means on the lower end of said trip lever for actuating said roller arm to unlock said locking bar and lower said plow.

13. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a reciprocable locking bar operatively connected to said land wheel axle and having a locking notch therein, means mounted on said frame and engageable with the notch on said bar, a trip lever pivoted to said frame, a spring pressed roller pivoted to said lever for normally depressing and locking said bar against said first named roller, means for locking said rack in elevated position, and means carried by said trip lever and engageable with said locking means for unlocking said rack.

14. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a locking bar operatively connected to one of said axles, means for locking said bar when said plow bases are raised, spring actuated means carried by said bar and adapted to actuate said rack to raised position, and tripping means mounted on said frame for releasing said rack whereby said racks drop by gravity into engagement with said pinion.

15. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, means operatively connected to one of said axles for locking said plow bases in elevated position, means associated with said first named means for automatically raising said rack to raised position at the conclusion of the lifting operation, and means mounted on said frame for releasing said rack whereby said rack falls by gravity into engagement with said pinion.

16. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, means operatively connected to one of said axles for locking said plow bases in elevated position, spring actuated means associated with said first named means for automatically raising said rack to raised position at the conclusion of the lifting operation, and means mounted on said frame for releasing said rack whereby said rack falls by gravity into engagement with said pinion.

17. A plow comprising a frame, plow bases carried by said frame, land and furrow wheel axles pivoted to said frame, wheels journaled on said axles, operative connections between said axles, means operatively connected to one of said axles for locking said plow bases in elevated position, a pinion secured to one of said wheels, a rack pivoted to said frame and movable into engagement with said pinion for raising said plow, means for automatically raising said rack at the conclusion of said lifting operation, and means for permitting said rack to fall by gravity into engagement with said pinion.

18. A plow comprising a frame, plow bases carried by said frame, land and furrow wheel axles pivoted to said frame, wheels journaled on said axles, operative connections between said axles, a pinion secured to one of said wheels, a rack pivoted to said frame and movable into engagement with said pinion for raising said plow, a locking connection operatively connected to one of said axles, means mounted on said frame for locking said connection when said plow is raised, means actuated by said connection for raising said rack at the conclusion of said lifting operation, and means for tripping said rack whereby said rack falls by gravity into engagement with said pinion.

19. A plow comprising a frame, plow bases carried by said frame, land and furrow wheel axles pivoted to said frame, wheels journaled on said axles, operative connections between said axles, a pinion secured to one of said wheels, a rack pivoted to said frame, and movable into engagement with said pinion for raising said plow, a locking connection operatively connected to one of said axles, means mounted on said frame for locking said connection when said plow is raised, means actuated by said connection for raising said rack at the conclusion of said lifting operation, and manually controlled means mounted on said frame and operatively connected to said rack whereby said rack falls by gravity into engagement with said pinion.

HERMAN E. ALTGELT.